INVENTOR.
W. W. EVERTS,
BY B M Ublium
ATTORNEY.

Jan. 12, 1932.   W. W. EVERTS   1,841,021
POWER TRANSMITTING DEVICE
Filed Dec. 27, 1930   4 Sheets-Sheet 4
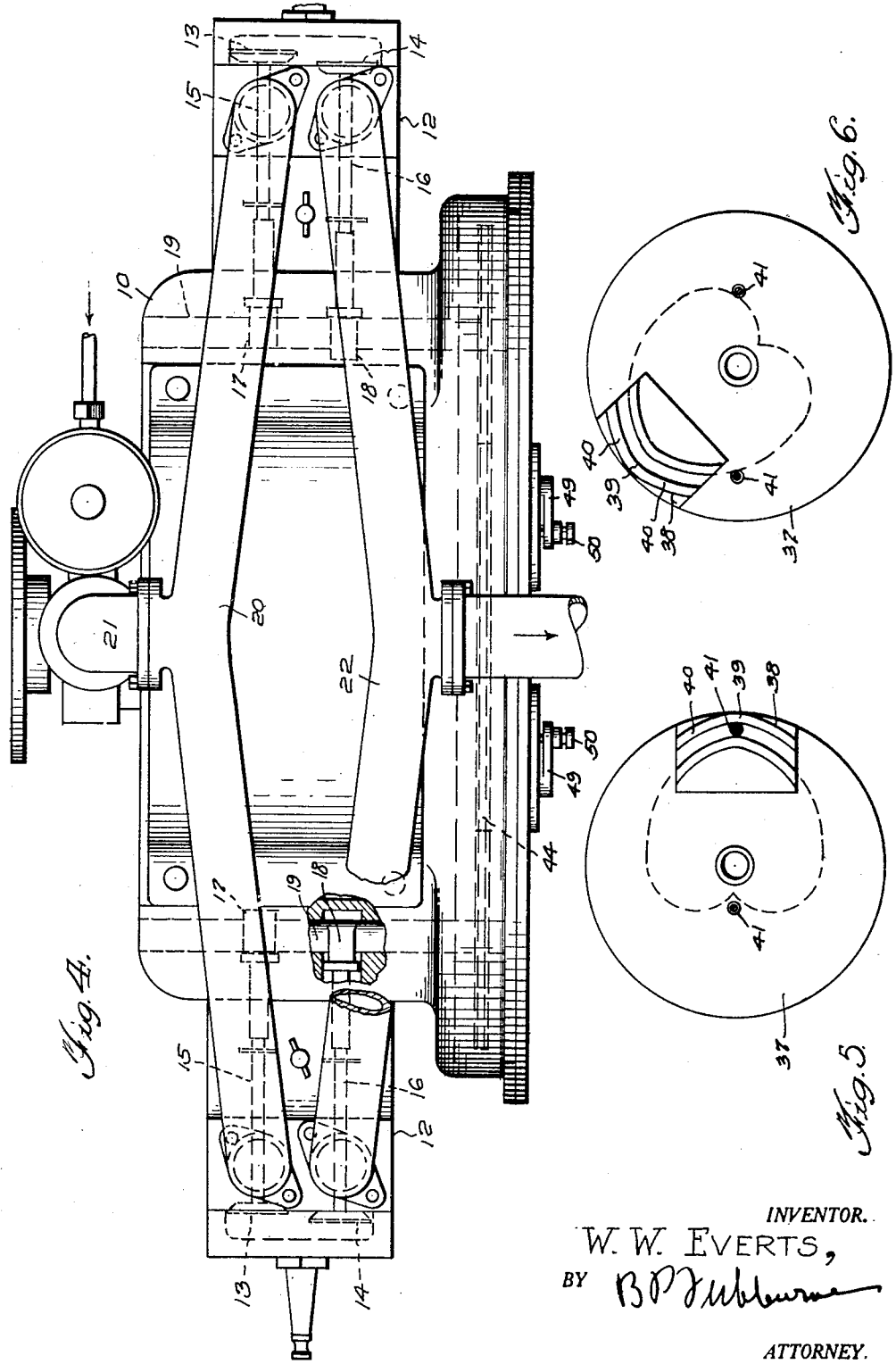
INVENTOR.
W. W. EVERTS,
BY
ATTORNEY.

Patented Jan. 12, 1932

1,841,021

UNITED STATES PATENT OFFICE

WALTER W. EVERTS, OF SAN ANTONIO, TEXAS, ASSIGNOR TO EVERTS-ELLINGTON COMPANY, OF SAN ANTONIO, TEXAS, A CORPORATION OF TEXAS

POWER TRANSMITTING DEVICE

Application filed December 27, 1930. Serial No. 505,169.

My invention relates to power transmitting devices for converting reciprocatory motion into rotary motion.

In accordance with my invention, I provide a reciprocatory rack element, embodying a pair of spaced racks, between which is arranged a mutilated pinion. The mutilated portion of the pinion extends throughout the major portion of the periphery of the pinion, leaving a set of teeth upon the periphery of the pinion, which extend throughout less than one-half of the periphery of the pinion. The arrangement is such that the pinion teeth alternately engage the rack teeth, and when the rack element is in the extreme end position in either direction, the pinion teeth disengage the teeth of both racks. The mutilated pinion drives a rotary element, such as a fly-wheel, and this fly-wheel is equipped with a cam arranged to engage with shifting elements connected with the ends of the rack element. The cam and shifting elements are so correlated that when the rack element is in the extreme end position, in either direction, the teeth of the mutilated gear being out of engagement with the teeth of both racks, the cam and shifting element will move the rack element with relation to the mutilated pinion, and in the direction of rotation of the mutilated pinion, sufficiently to bring the tooth, or teeth, of the mutilated pinion into proper mesh with the tooth, or teeth, of the corresponding rack. The co-acting cam and shifting element also serve as a connection between the reciprocatory rack element and the mutilated pinion, preventing the rack element from partaking of improper movement with relation to the mutilated pinion, and causing the rack element to travel in a proper timed order with relation to the movement of the mutilated pinion. This timing operation is particularly important where the rack element is moved by pistons of an internal combustion engine, wherein a charge is compressed upon the compression stroke of the piston. The motion transmitting device is particularly well adapted for use in connection with an internal combustion engine, but is not necessarily restricted to such use.

Figure 1:
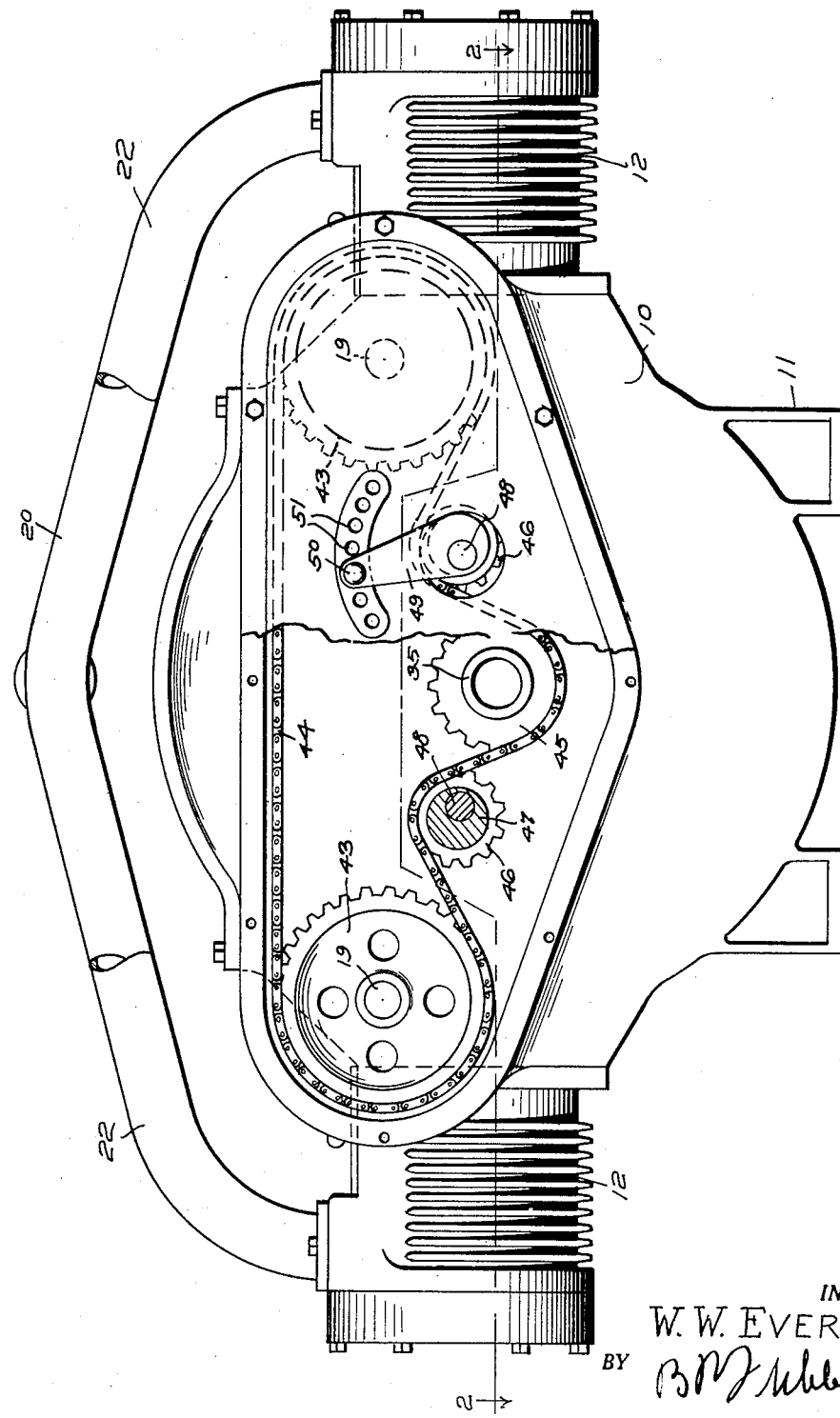
Figure 2:
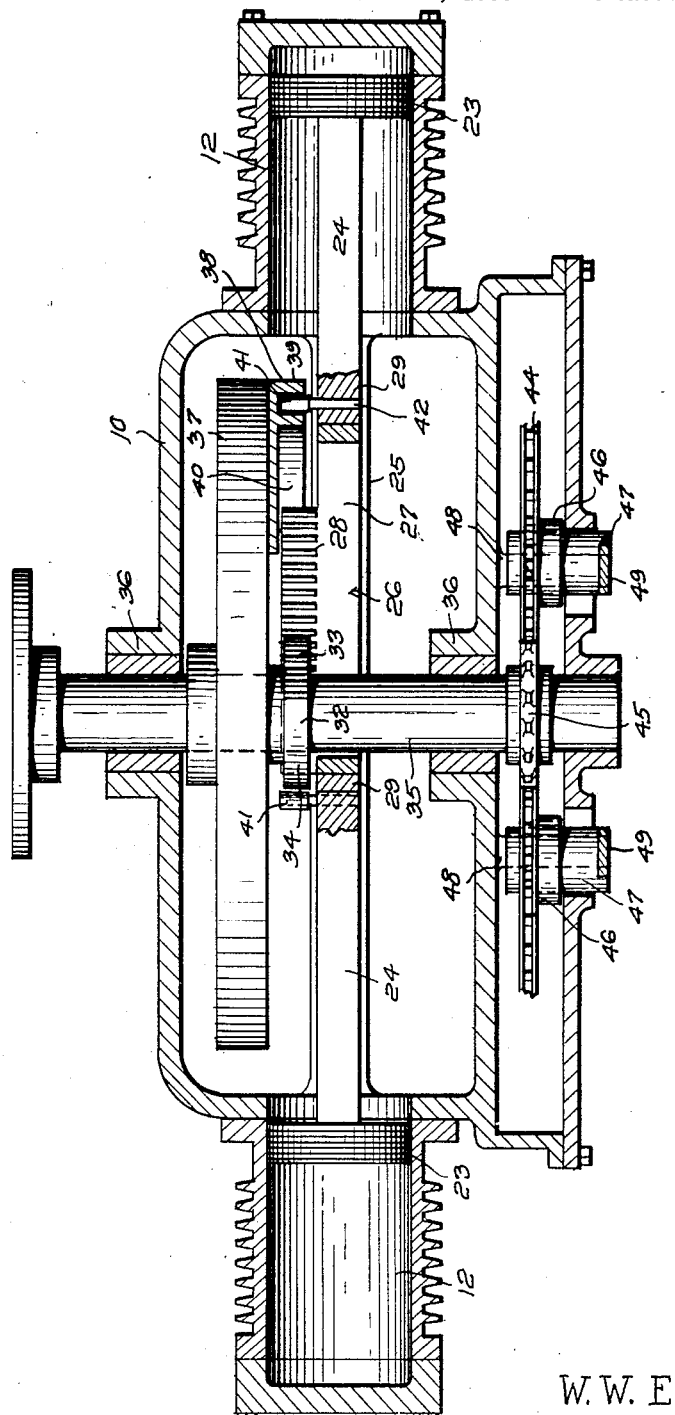
Figure 3:
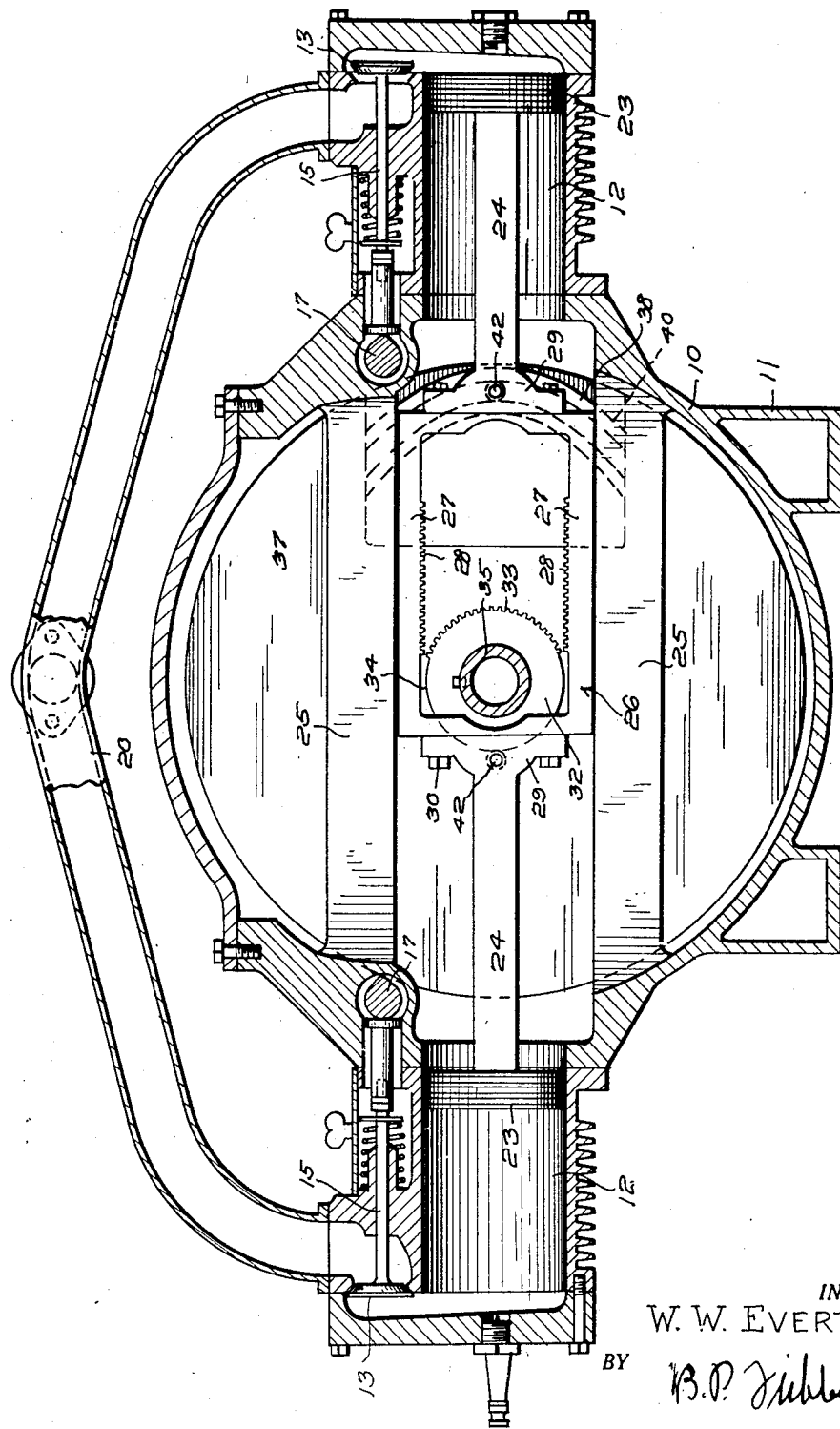

In the accompanying drawings forming a part of this specification, and in which like numerals are employed to designate corresponding parts throughout the same, Figure 1 is a side elevation of apparatus embodying my invention, parts broken away, Figure 2 is a horizontal sectional view taken on line 2—2, of Figure 1, Figure 3 is a central vertical longitudinal section through the apparatus, Figure 4 is a plan view of the same, Figure 5 is a side elevation of the rack element and mutilated pinion.

In the drawings, wherein for the purpose of illustration is shown a preferred embodiment of my invention, the numeral 10 designates a casing shown as supported by legs 11, or the like. The numeral 12 designates opposed horizontal cylinders, of an internal combustion engine, which are bolted or otherwise rigidly attached to the casing 10. The cylinders have inlet and exhaust valves 13 and 14, the engine being illustrated as of the usual four cycle type. These valves have stems 15 and 16, respectively, which are actuated in proper timed order by means of cams 17 and 18, respectively, mounted upon transverse cam shafts 19. Leading to the inlet valves 13 is an intake manifold 20, having connection with a carburetor 21, as shown. Leading to the exhaust valves 14 is an exhaust manifold 22, as shown.

Mounted to reciprocate within the cylinders 12 are pistons 23, having connecting rods 24, rigidly connected therewith, and extending inwardly between upper and lower horizontal guides 25. The numeral 26 designates a reciprocatory rack element, as a whole, embodying a rectangular frame including horizontal racks 27, having longitudinal sets of teeth 28. The connecting rods 24 are provided, at their inner ends, with attaching heads 29, which are rigidly attached to the ends of the rack element or frame 26, by bolts 30, or the like. The rack element 26 operates between the guides 25. The pistons 23 are, therefore, rigidly connected with the reciprocatory rack element 26, which is positively guided in its movement, and these pistons are, therefore, supported during their travel, so that their lower sides will not wear unevenly by virtue of undue contact with the walls of the cylinders 23.

Arranged between the racks 27 is a mutilated pinion 32, having a set of teeth 33 upon its periphery, which set of teeth extend for less than one-half of the periphery, the remaining major portion 34 being smooth or free from teeth.

As clearly shown in Figure 3, the rack element 26 is in the extreme end position to the right, and, in this position, the mutilated pinion teeth 33 disengage both sets of teeth 28, of the racks. The mutilated pinion 32 is rigidly mounted upon a transverse horizontal tubular shaft 35, mounted in bearings 36. This tubular shaft is of importance when the engine is mounted upon an aeroplane, so that bullets from a machine gun may be shot through the tubular shaft.

Timing means are provided for connecting the rotary mutilated pinion 32 with the reciprocatory rack element 26, embodying a fly-wheel 37, rigidly mounted upon the shaft 35, and having a grooved cam 38, rigidly attached to its side adjacent to its periphery. This cam is in the form of a double involute curve, having an intermediate portion 39, which is concentric with the fly-wheel, and inwardly curved or inclined outer portions 40, eccentric with respect to the fly-wheel. The opposite ends of the grooved cam are open, as shown, for receiving rollers 41, carried by pins 42, which are rigidly connected with the attaching heads 29. These pins and rollers constitute shifting elements.

The cam shafts 19 have sprocket wheels 43, rigidly secured thereto, engaged by a sprocket chain 44, engaging a sprocket wheel 45, mounted upon the tubular shaft 35. The numeral 46 designates adjustable sprocket wheels engaging the sprocket chain 44, to regulate its tension. These sprocket wheels are rotatably mounted upon sleeves 47, which are concentric with relation thereto, and these sleeves are eccentrically mounted upon pivots 48, and the sleeves are turned by means of cranks 49, having pins 50, for insertion within selected openings 51, formed in stationary segments. Any suitable means may be employed to regulate the tension of the sprocket chain.

In the operation, the apparatus is as follows:

As shown in Figure 3, when the rack element 26 is shifted to the end of its movement to the right, the mutilated pinion teeth 33 disengage both sets of rack teeth 28. At this time, the shifting element, including the roller 41, is at the intermediate or central concentric portion 39, of the grooved cam 38. Upon the further turning movement of the fly-wheel 37, the eccentric upper end portion 40 of the grooved cam will move the rack element 26 to the left, with relation to the mutilated pinion, thereby bringing the teeth of the rack and the teeth of the pinion into engagement, and the corresponding relative movement occurring when the rack element reaches the end of its movement to the left. The cam and shifting elements, therefore, effect a timed relative movement between the rack element and pinion, after the rack element totally disengages the pinion, for bringing the teeth of the rack into proper mesh with the teeth of the pinion. Further, the cam and shifting elements serve to positively limit the movement of the rack element and pistons, in opposite directions. This construction also permits of the engine being driven in either direction.

It is to be understood that the form of my invention herein shown and described is to be taken as the preferred example of the same, and that various changes in the shape, size and arrangement of parts may be resorted to without departing from the spirit of my invention, or the scope of the subjoined claims.

Having described my invention, what I claim is:

1. A power transmitting device comprising, a reciprocatory rack element including a pair of spaced racks having sets of teeth, a mutilated pinion arranged between the racks and having a set of teeth extending over less than one-half of the periphery of the pinion, the arrangement being such that the teeth of the pinion are adapted to simultaneously disengage the teeth of both racks when such racks approach the end of their travel in either direction and to alternately engage the same, a rotary element driven by the pinion and provided with a cam which rotates therewith, said cam having its effective convex face arranged outermost and its ends spaced, and shifting elements attached to the rack element near its ends and adapted to engage the cam.

2. A power transmitting device comprising, a reciprocatory rack having a set of teeth, a mutilated pinion arranged near the rack and having a set of teeth for coaction with the first named set of teeth, a rotary element driven by the pinion and provided with a cam for rotation therewith, said cam having its effective convex surface arranged outermost, a shifting element connected with the rack and adapted to engage the cam, a cylinder having its longitudinal axis extending in a direction longitudinally of the reciprocatory rack, a piston to reciprocate within the cylinder, and a rod connecting the piston and rack, the arrangement being such that the piston upon its power stroke causes the shifting element to exert a force upon the outer convex effective surface of the cam.

3. A power transmitting device comprising, a reciprocatory rack element including a pair of spaced racks having sets of teeth, a rotary shaft extending between said racks, a mutilated pinion mounted upon the shaft and arranged between the racks and having a set of teeth, a rotary element mounted upon the shaft and having a diameter extending throughout substantially the entire stroke of the rack element and provided with a double involute cam, said cam having its effective convex surface arranged outermost, and shifting elements attached to the rack element near its ends and adapted to engage the cam, the arrangement being such that the cam and shifting elements serve to limit the stroke of the rack element and also shift the rack element longitudinally with relation to the pinion.

4. A power transmitting device comprising, a pair of spaced opposed cylinders, pistons mounted therein to move inwardly upon the power stroke, a reciprocatory rack element arranged between the cylinders and including a pair of spaced racks having sets of teeth, a rotary shaft extending between said racks, a mutilated pinion mounted upon the shaft and arranged between the racks and having a set of teeth extending over less than one-half of its periphery, a fly-wheel mounted upon the shaft and having a diameter extending substantially throughout the entire stroke of the rack element, and provided with a double involute cam to rotate therewith, said cam having its effective convex surface arranged outermost, shifting elements attached to the rack element near its ends and adapted to engage the cam, the arrangement being such that the cam and shifting elements serve to limit the stroke of the rack element and also shift the rack element longitudinally with relation to the pinion, upon the power stroke of the piston.

5. A power transmitting device comprising, a reciprocatory rack element including a pair of spaced racks having sets of teeth, a rotary shaft extending between said racks, a mutilated pinion mounted upon the shaft and arranged between the racks and having a set of teeth extending over less than one-half of its periphery, a fly-wheel mounted upon the shaft, a curved cam attached to the fly-wheel to rotate therewith and having its effective convex surface arranged outermost, shifting elements attached to the rack element and adapted to engage the cam, the arrangement being such that the cam and shifting elements serve to limit the stroke of the rack element and also shift the rack element longitudinally with relation to the pinion, connecting rods rigidly attached to the ends of the rack element, opposed cylinders arranged near the ends of the rack element and having their longitudinal axes extending in a direction longitudinally of the rack element pistons within the cylinders and rigidly attached to the connecting rods, and means to positively guide the rack element during its movement.

6. A power transmitting device comprising, a reciprocatory rack element including a pair of spaced racks having sets of teeth, a rotary shaft extending between the said racks, a mutilated pinion mounted upon the shaft and arranged between the racks and having a set of teeth extending over less than one-half of its periphery, a fly-wheel mounted upon the shaft and having a diameter extending throughout substantially the entire stroke of the rack element, a pair of cam elements rigidly attached to one side of the fly-wheel and projecting laterally therebeyond and providing a cam groove between the same, said cam groove being convex in an outward direction, shifting elements attached to the rack element and adapted to pass through the cam groove, connecting rods rigidly attached to the ends of the rack element, opposed cylinders arranged near the ends of the rack element and having their longitudinal axes extending in a direction longitudinally of the rack element, pistons within the cylinders and rigidly attached to the connecting rods, and means to positively guide the rack element during its movement.

In testimony whereof I affix my signature.

WALTER W. EVERTS.